(12) United States Patent
Teng et al.

(10) Patent No.: US 11,342,553 B2
(45) Date of Patent: May 24, 2022

(54) METHODS FOR PRELITHIATION OF SILICON CONTAINING ELECTRODES

(71) Applicant: ENEVATE CORPORATION, Irvine, CA (US)

(72) Inventors: Shiang Jen Teng, Irvine, CA (US); Xiaohua Liu, Irvine, CA (US); David J. Lee, Irvine, CA (US); Tracy Ho, Garden Grove, CA (US); Mai Vietnam, Stanton, CA (US); Benjamin Yong Park, Mission Viejo, CA (US); Frederic Bonhomme, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 211 days.

(21) Appl. No.: 16/590,859

(22) Filed: Oct. 2, 2019

(65) Prior Publication Data
US 2021/0104737 A1    Apr. 8, 2021

(51) Int. Cl.
*H01M 4/36* (2006.01)
*H01M 4/38* (2006.01)
*H01M 4/04* (2006.01)

(52) U.S. Cl.
CPC ......... *H01M 4/366* (2013.01); *H01M 4/0416* (2013.01); *H01M 4/0419* (2013.01); *H01M 4/382* (2013.01); *H01M 4/386* (2013.01)

(58) Field of Classification Search
CPC ...... H01M 4/366; H01M 4/386; H01M 4/382; H01M 4/405; H01M 4/0419; H01M 4/0416
See application file for complete search history.

(56) References Cited

U.S. PATENT DOCUMENTS

| 2014/0272567 | A1* | 9/2014 | Zhang | H01M 4/139 |
| | | | | 429/212 |
| 2015/0000118 | A1* | 1/2015 | Zhao | H01M 10/0569 |
| | | | | 29/623.3 |
| 2018/0294476 | A1* | 10/2018 | Zhamu | H01M 4/382 |
| 2018/0301707 | A1* | 10/2018 | Pan | H01M 4/134 |
| 2019/0305298 | A1* | 10/2019 | Chae | H01M 4/1391 |
| 2020/0058929 | A1* | 2/2020 | Chae | H01M 4/1395 |
| 2020/0067080 | A1* | 2/2020 | Pan | H01M 4/58 |
| 2021/0126250 | A1* | 4/2021 | Jiang | H01M 4/0421 |

FOREIGN PATENT DOCUMENTS

| WO | WO-2018191843 A1 * | 10/2018 | H01M 4/62 |
| WO | WO-2018212453 A1 * | 11/2018 | H01M 4/131 |

* cited by examiner

*Primary Examiner* — Maria Laios
*Assistant Examiner* — Adam J Francis
(74) *Attorney, Agent, or Firm* — McAndrews, Held & Malloy, Ltd.

(57) ABSTRACT

The present application describes a method of forming an energy storage device that directly adds a lithium layer (such as a lithium foil or otherwise deposited lithium) into the cell stack during cell assembly for prelithiating. The method includes providing a silicon-based anode, providing a cathode, positioning a separator between the anode and the cathode, and disposing a lithium layer between the silicon-based anode and the separator, such that the lithium layer is in contact with the anode.

31 Claims, 10 Drawing Sheets

METHODS FOR PRELITHIATION OF SILICON CONTAINING ELECTRODES

BACKGROUND

Field

The present disclosure relates to electrodes used in electrochemical cells. In particular, the present disclosure relates to methods and apparatuses for prelithiation of silicon containing electrodes for use in electrochemical cells.

Description of the Related Art

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity and high-voltage cathodes, high-capacity anodes and accordingly functional electrolytes with high voltage stability, interfacial compatibility with electrodes and safety.

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Silicon (Si) is one of the most promising anode materials for Li-ion batteries due to its high specific gravimetric and volumetric capacity (3579 mAh/g and 2194 mAh/cm$^3$ vs. 372 mAh/g and 719 mAh/cm$^3$ for graphite), and low lithiation potential (<0.4 V vs. Li/Li$^+$). Among the various cathodes presently available, layered lithium transition-metal oxides such as Ni-rich Li[Ni$_x$Co$_y$Mn(Al)$_{1-x-y}$]O$_2$ (NCM or NCA) are the most promising ones due to their high theoretical capacity (~280 mAh/g) and relatively high average operating potential (3.6 V vs Li/Li$^+$). In addition to Ni-rich NCM or NCA cathode, LiCoO$_2$ (LCO) is also a very attractive cathode material because of its relatively high theoretical specific capacity of 274 mAh g$^{-1}$, high theoretical volumetric capacity of 1363 mAh cm$^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (>300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes, and the expansion of the anode leads to an endless exposure of Si particle surfaces to the liquid electrolyte. This results in an irreversible capacity loss at each cycle due to the reduction at the low potential where the liquid electrolyte reacts with the exposed surface of the Si anode. Because of the generally inferior cycle life of Si compared to graphite, only a small amount of Si or Si alloy is used in conventional anode materials.

The NCM (or NCA) or LCO cathode usually suffers from an inferior stability and a low capacity retention at a high cut-off potential. The reasons can be ascribed to the unstable surface layer's gradual exfoliation, the continuous electrolyte decomposition, and the transition metal ion dissolution into electrolyte solution. In addition, oxidative instability of the conventional non-aqueous electrolyte takes place at voltages beyond 4.5 V, which can lead to accelerated decay of cycling performance. The major limitations for LCO cathode are high cost, low thermal stability, and fast capacity fade at high current rates or during deep cycling. LCO cathodes are expensive because of the high cost of Co. Low thermal stability refers to exothermic release of oxygen when a lithium metal oxide cathode is heated. In order to make good use of Si anode//NCM or NCA cathode-, and Si anode//LCO cathode-based Li-ion battery systems, the aforementioned barriers need to be overcome.

Prelithiation of silicon is an effective way to alleviate the large volume expansion and rapid capacity fade for silicon-based anodes. Prelithiation involves intercalating lithium ions into the silicon prior to subjecting the electrode to a charging cycle. Known methods of prelithiation can involve dipping a web of electrochemically active material, prior to forming an electrode therefrom, in an organic salt while running a current through the web. These types of processes typically require high temperatures to drive lithiation of the active material, and can result in lithium metal plating onto the active material during the process. Other methods of prelithiation involve directly contacting electrochemically active material with lithium metal, or depositing lithium metal directly onto the active material, for example via a vapor deposition process. As these methods can include, or even require, plating of lithium, the resultant prelithiated active material can present safety risks due to the hazardous nature of lithium metal. The processes also require numerous extra processing steps prior to forming an electrode from the active material. Furthermore, due to the reactivity of the materials typically involved in these processes, an inert atmosphere is often required further complicating processing and scalability.

SUMMARY

In some aspects, a method of forming an energy storage device is provided. The method includes providing a Si-based anode, providing a cathode, providing a separator comprising a lithium layer on a surface of the separator, and positioning the separator between the anode and the cathode, such that the lithium layer is in contact with the anode.

In some embodiments, the lithium layer comprises lithium deposited on the surface of the separator. In some embodiments, the lithium is deposited on the surface of the separator by spraying powder lithium onto the surface or sputtering lithium onto the surface. In some embodiments, the lithium layer comprises a lithium foil applied to the surface of the anode. In some embodiments, the lithium layer comprises an amount of lithium for about 10% to about 30% of anode capacity.

In some embodiments, the separator is resistant to reduction by the lithium. In some embodiments, the separator is made of a material selected from the group consisting of polyolefin, cellulose, and combinations thereof. In some embodiments, the polyolefin is selected from polyethylene, polypropylene, and combinations thereof. In some embodiments, the separator further comprises a surface coating between the surface of the separator and the lithium layer.

In some embodiments, the method further comprises forming a safety layer on at least the lithium layer. In some embodiments, the safety layer comprises a polymeric material. In some embodiments, the polymeric material is selected from the group consisting of polyvinylidene fluoride (PVDF), poly(methyl methacrylate) (PMMA), styrene butadiene rubber (SBR), poly(acrylic acid) (PAA), poly(ethylene oxide) (PEO), poly(propylene oxide) (PPO), and combinations thereof.

In some embodiments, the method further comprises applying a clamping pressure to the energy storage device across the anode, the cathode, and the separator. In some embodiments, the clamping pressure is between about 20 psi and about 160 psi. In some embodiments, the clamping pressure is applied for at least about 10 hours. In some embodiments, the clamping pressure is applied for about 3 hours at about 160 psi.

In some embodiments, the anode is a Si-dominant anode. In some embodiments, the anode comprises a composite material film comprising greater than 0% and less than about 90% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film. In some embodiments, the anode comprises a self-supporting composite material film.

DETAILED DESCRIPTION

Disclosed herein includes a method of forming an energy storage device. Specifically, the method includes directly adding a lithium layer (such as a lithium foil or otherwise deposited lithium) into the cell during cell assembly and prelithiating the anode. Prelithiation of Si-based anode can provide at least the following advantages to energy storage devices: (1) compensating the lithium loss that is known to occur upon the first charge cycle thereby improving the initial Coulombic efficiency (ICE) and during the repeated charge/discharge cycles; (2) lowering the silicon anode potential thereby increasing the operating voltage of the cell; and (3) providing a mean to control the stress within the electrode to achieve the best mechanical property and to maintain the electrode integrity during cycling (i.e., reducing the relative volume changes).

To overcome the current obstacles associated with traditional prelithiation methods, the prelithiation process in the method of forming an energy storage device does not involve the handling of dangerous lithiated silicon powder or tedious cell disassembly and reassembly. The method of forming an energy storage device includes providing a Si-based anode, providing a cathode, position a separator between the anode and the cathode, and disposing a lithium layer between the separator and the anode.

The lithium layer may be either deposited onto or bonded to the separator first, or attached to the anode first. When the lithium layer is provided on the separator prior to the component stacking, the separator is positioned between the anode and the cathode with the lithium layer faces the anode during assembly. The lithium layer is in contact with the anode when the cell is assembled. When the lithium layer is provided on the anode prior to the component stacking, a lithium layer may be attached to both sides of the anode.

Figure 1:
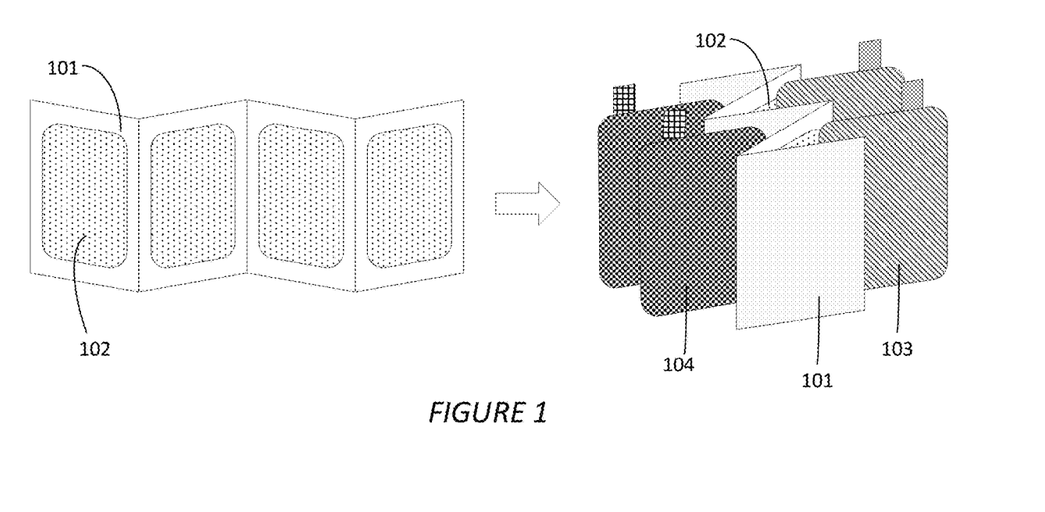
FIG. 1 illustrates an example of the stacking order of anodes, cathodes, and separators with a lithium layer disposed on one of its surfaces.

The lithium layer on the separator may be provided by bonding a lithium foil to the surface of the separator. The lithium foil may be bonded to the separator surface using an adhesive. Examples of adhesives include polyvinylidene fluoride (PVDF), poly(methyl methacrylate) (PMMA), styrene butadiene rubber (SBR), poly(acrylic acid) and (PAA). The lithium layer may also be deposited onto the separator surface using spraying of powdered lithium, thermal evaporation, sputtering, and chemical deposition (e.g. utilizing a salt precursor or other electrolysis deposition). Optionally, the deposited lithium may be patterned on one side of the separator and spaced out adequately to have a precise position on top of the Si-based anode during the component stacking. FIG. 1 illustrates one embodiment of the cell stacking and assembly order. The separator 101 includes a lithium layer 102 on a surface. When the cell is assembled, a series of separators 101 are folded, and the anodes 103 and cathodes 104 are inserted into alternating separator folds to form a stack (see also FIG. 3). The lithium layer 102 may be bonded to or patterned on one side of the separator 101, and the lithium layer 102 may be precisely positioned so that it is on top of the silicon-based anode during the component stacking.

Alternatively, the lithium layer may be attached to the anode first. A thin lithium foil is prepared or provided, and then gently applied onto the anode surface. The lithium foil may be cold rolled or laminated onto the anode surface, and the lithium foil would stick to the anode surface. This step may be done in a dry room.

The lithium layer includes lithium in an amount of about 5% to about 40% of the anode capacity, 10% to about 30% of the anode capacity, preferably about 15% to about 30% or about 10% to about 25% of the anode capacity. In some implementations, the amount of Li in the lithium layer is configured to account for about 10%, about 20%, about 30% or about 40% of the anode capacity. The target percentage of prelithiation is calculated based on the anode capacity (mAh/cm$^2$). The amount of lithium is then calculated based on its specific capacity (mAh/g). For example, to prelithiate 15% of a 19.35 mAh anode, 2.89 mAh of capacity is necessary from the Li foil and 749 μg of Li foil was prepared based on lithium's theoretical specific capacity (3860 mAh/g). Li metal was rolled in between two rollers to make a very thin film and the desired area was cut out to control the amount of lithium. As described, the degree of prelithiation may be controlled by using other specific weights of lithium layer with relatively simple modifications of cell assembly and treatment procedures.

In some implementations, the lithium layer consists essentially of Li. In some implementations, the lithium layer is a lithium foil. In some implementations, the lithium layer is a powdered Li layer. In some implementations, the lithium layer is a sputtered Li layer.

Figure 2:
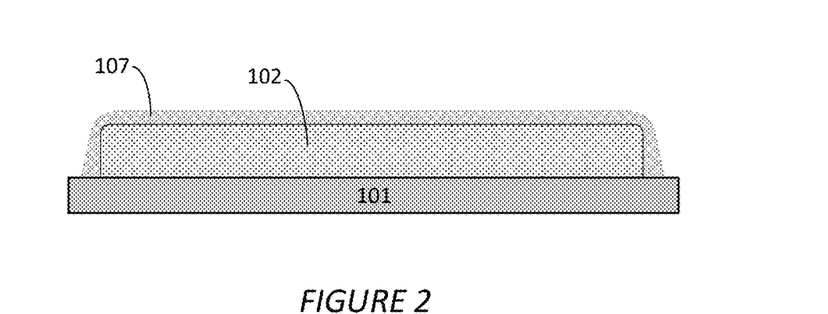
FIG. 2 is a cross sectional view of a separator with a lithium layer and a protective layer over the lithium layer.

The separator may be a material that is resistant to reduction by lithium. Examples of the separator materials include polyethylene (PE), polypropylene (PP), ceramics (such as alumina, zirconia, and other ceramic composites) and c, or combinations of layers thereof. Optionally, the separator may be coated to reduce or prevent reaction with lithium. The coating for the separator may include metal oxides, polyvinylidene fluoride (PVDF) and Poly(methyl methacrylate) PMMA. Optionally, the lithium layer, either on the separator or on the anode, may have a protective layer over it to reduce reaction of the lithium with the environment. FIG. 2 illustrates an example of protective layer 107 covering the lithium layer 102 over the separator 101. The protective layer may also stabilize the lithium for handling and safety. The protective layer may include a polymeric material. For example, the polymeric material may be poly (methyl methacrylate) (PMMA), polyvinylidene fluoride (PVDF), styrene butadiene rubber (SBR), poly(acrylic acid) (PAA), poly(ethylene oxide) (PEO) or poly(propylene oxide) (PPO), or combinations thereof, that can be dissolved in solvent or can be processed with plasticizer. The protective layer may be applied using dip coating or spray coating techniques.

Figure 3:
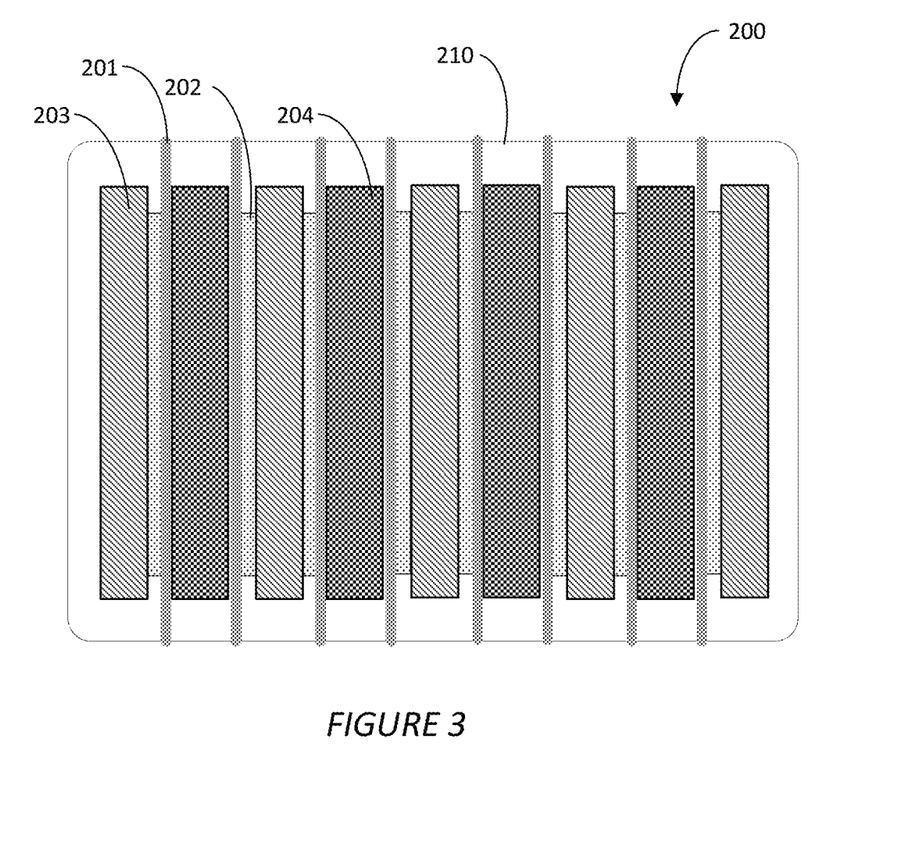
FIG. 3 is an illustration of the cross-sectional view of the energy storage device after cell assembly.

Multiple anodes 203, cathodes 204, and separators 201 can be stacked to form an energy storage device 200 as shown in FIG. 3. The lithium layer 202 is disposed on one side of the separator 201, and faces the anode 203 when assembled. Once the stack is formed, it can be enclosed in a housing 210, such as a pouch material, and the electrolyte may be added to the inside of the housing. The housing is then sealed.

Figure 4:
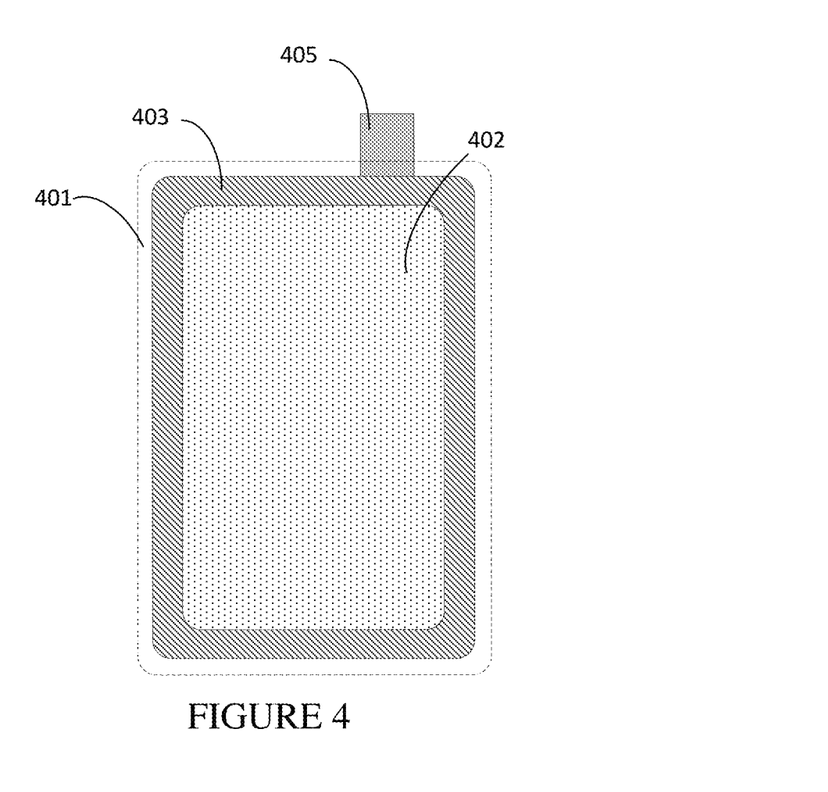
FIG. 4 shows the contact area of a lithium layer on an anode when the cell is assembled.

FIG. 4 illustrates the relative sizes of the anode 403 and the lithium layer 402 when assembled in certain implementations. The size of the lithium layer 402 may be slightly smaller than the size of the anode 403. The separator 401 is shown as the dotted line, and the electrical contact 405 extends from the current collector. The electrical contact 405 may be, for example, a copper, stainless steel, nickel, or titanium tab.

Figure 5:
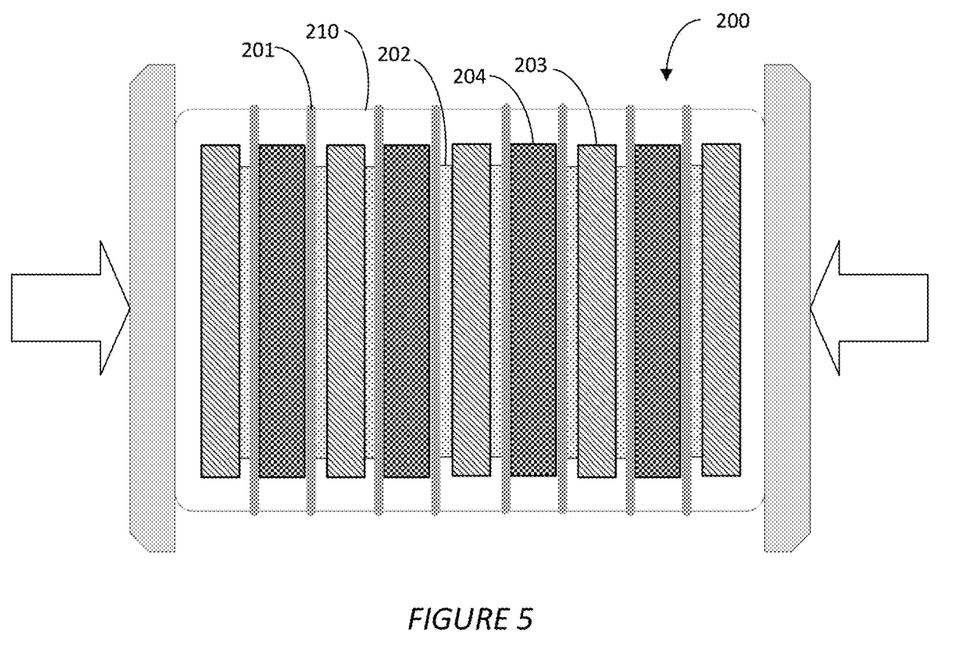
FIG. 5 is an illustration of the clamping pressure being applied to the assembled cell.
Figure 6A:
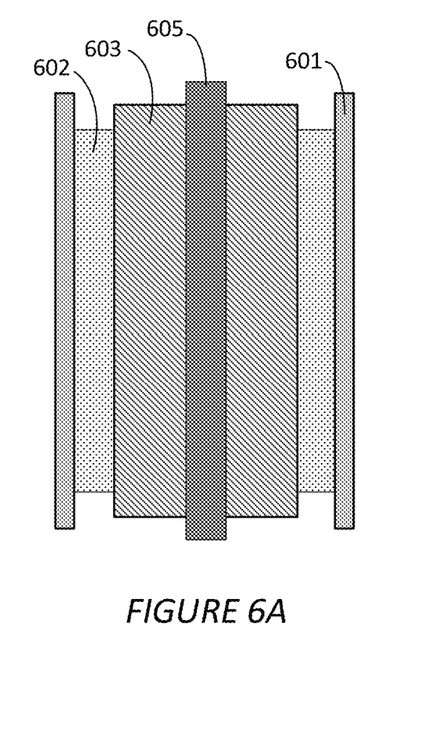
FIG. 6A is an illustration of a silicon-based anode prior to prelithiation.
Figure 6B:
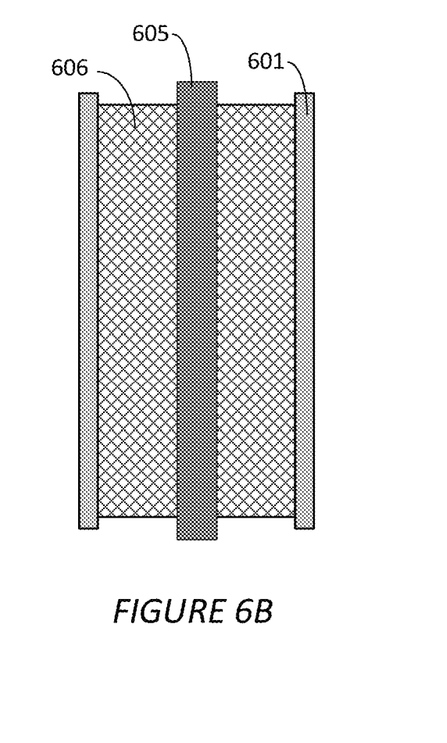
FIG. 6B is an illustration of a silicon-based anode containing lithium silicide $Li_xSi$ after prelithiation.

Once the energy storage device is assembled, a clamping pressure can be applied to the opposite sides of the device across the anodes, the cathodes and the separators as seen in FIG. 5. The pressure used in clamping the energy storage device 200 may be about 20 psi to about 160 psi, preferable about 40 psi to about 160 psi, or about 50 psi to about 150 psi. The time used in clamping the energy storage device 200 may be or be about 1 hour, 2 hours, 3 hours, 4 hours, 5 hours, 10 hours, 12 hours, 14 hours, 16 hours, 18 hours, 24 hours, 36 hours or 48 hours, or any range of values therebetween. The temperature used in clamping the energy storage device 200 may be or be about 20° C., 25° C., 30° C., 40° C., 50° C., 60° C., 70° C., 80° C., 90° C., 100° C., 150° C. or 200° C., or any range of values therebetween. The clamping pressure facilitates lithium diffusion from the thin lithium layers 202 into the silicon-based anodes 203 and achieve prelithiation. FIG. 6A shows the cross section of the anode portion of energy storage device prior to clamping. The lithium layer 602 is disposed between the separator 601 and the anode 603, which is on both sides of a current collector 605. After clamping, the lithium in lithium layer 602 has diffused into the anode 603 to form Li$_x$Si 606 (FIG. 6B). In addition, controlling the pressure during the prelithiation may also avoid anode level thickness increase.

Figure 7:
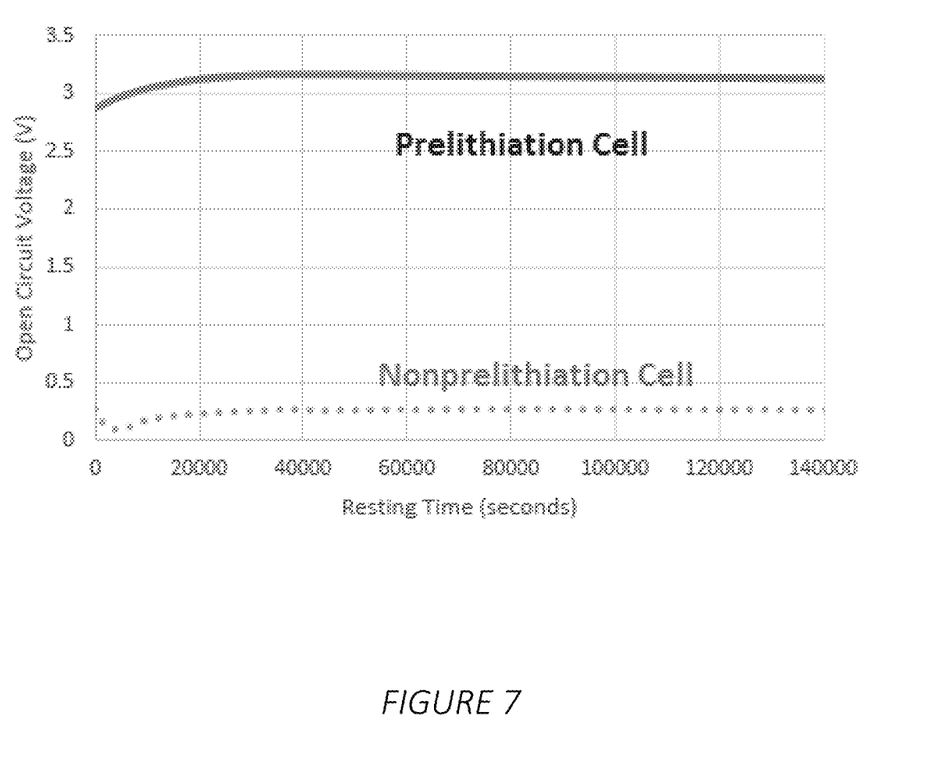
FIG. 7 shows the OCV stabilization after a prelithiation process with about 10 hours of rest under clamping.
Figure 8:
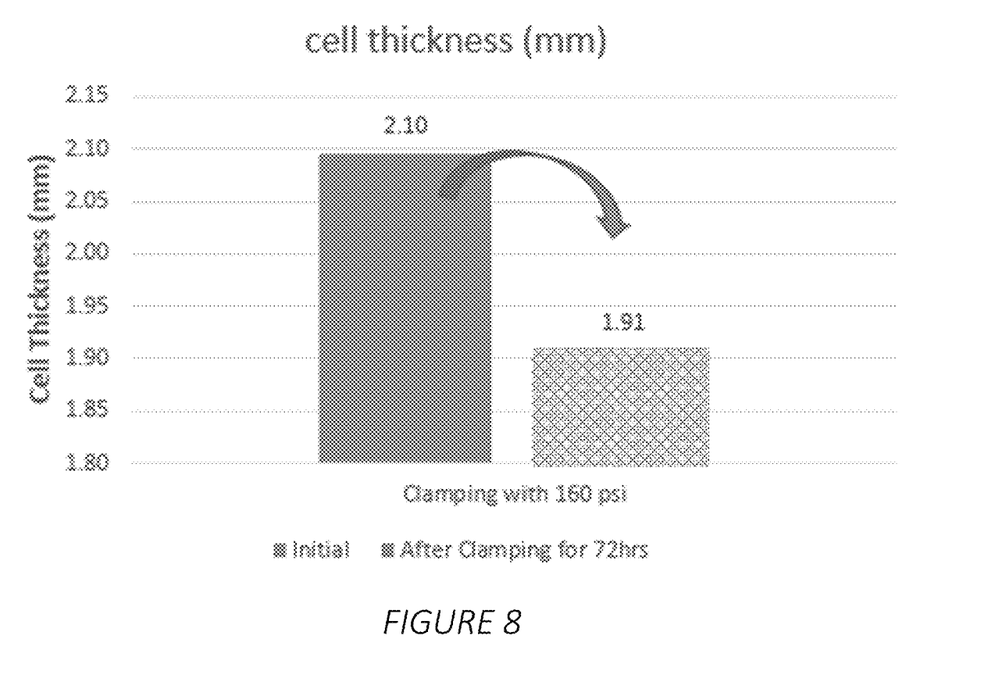
FIG. 8 shows cell thickness reduction of about 10% after clamping as lithium foils dissolve and Li diffuses into the silicon anode.

FIG. 7 demonstrates that during the clamping, the initial open circuit voltage (OCV) increases gradually over time and stabilizes when the lithium layer and silicon anode reach an equilibrium state. OCV is an electrochemical potential difference in between cathode and anode material. Non-prelithiated anodes and cathodes showed potential differences of close to 0V, and are expected to be slightly above 0V (typically less than 1V) after stabilization. In contrast, a prelithiated anode has an anode potential lower than that of a non-prelithiated anode. Therefore, the cell OCV between a cathode and a prelithiated anode is larger (around 3V, which indicates that the anode potential decreased by around 3V). The equilibrium state of the silicon anode and lithium layer indicates the final Li$_x$Si formation, as shown in FIG. 6B. In such an equilibrium state, the lithium layer has been fully diffused into the silicon anode to complete the pre-lithiation process. With sufficient pressure and rest time, the thin lithium foil may be fully diffused into the silicon-based anode and the cell thickness is at its minimum state, as shown in FIG. 8.

The method disclosed herein can achieve prelithiation in one step by applying adequate pressure to produce high energy lithium ion cells containing prelithiated silicon-based anode. It is appreciated that this significantly improves the silicon-based anode cell performance and can be easily adopted with conventional cell assembly processes.

Energy storage devices prelithiated as described above provide advantages over existing prelithiation methods. Advantages include the ability to be easily adopted into the manufacturing process and easily implemented. Furthermore, while other methods usually involve powder mixing or complicated steps for treatment on the electrode level, the method disclosed herein does not change any of the typical anode and cathode electrode preparation processes. In other words, the prelithiation step in the disclosed method may be easily dropped into the normal cell assembly process. In addition, the amount of prelithiation may be easily and precisely controlled by measuring the weight of lithium foil or the amount of lithium deposited on the anode or the separator.

An energy storage device produced in accordance with the method described herein comprises a Si-based anode comprising Li$_x$Si, a cathode, a separator between the anode and the cathode, and an electrolyte. An assembled cell stack is the stack of cells prior to lithiation process. The assembled cell stack prior to the pre-lithiation step includes a Si-based anode, a cathode, a separator between the anode and the cathode, and a lithium layer between the separator and the anode.

Energy Storage Device

The methods and apparatuses described herein may be advantageously utilized within an energy storage device, such as batteries, capacitors, and battery-capacitor hybrids. In some implementations, the energy storage device may be a lithium-ion battery. The energy storage device may comprise a first electrode and a second electrode, such as an anode and cathode. In some embodiments, at least one electrode may be a Si-based electrode. In some embodiments, the Si-based electrode is a Si-dominant electrode, where silicon is the majority of the active material used in the electrode (e.g., greater than 50% silicon). The energy storage device may further comprise a separator between the first electrode and the second electrode. In some implementations, the electrode may be prelithiated as described by the methods and by the apparatuses described herein.

Pouch Cell

Figure 9:
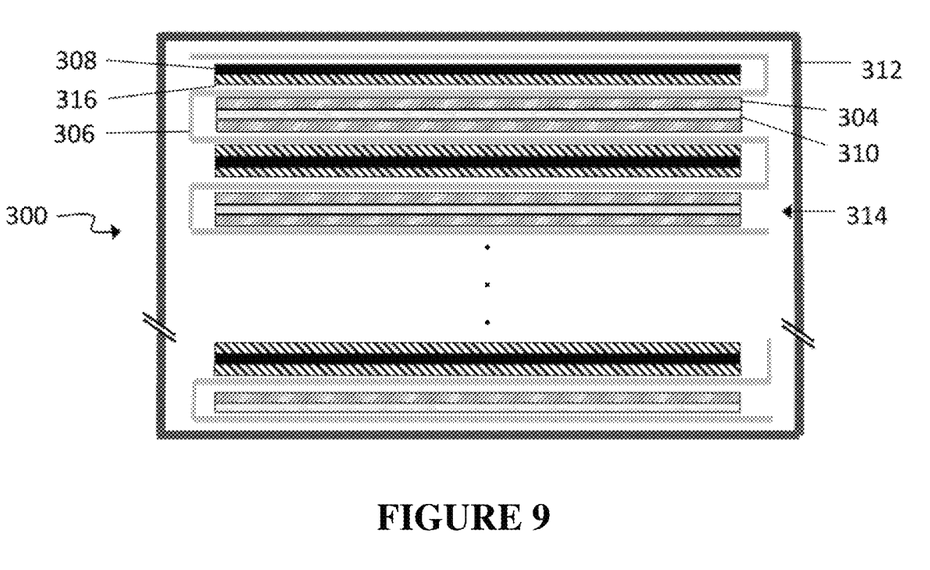
FIG. 9 depicts a cross-sectional schematic diagram of an example of a lithium-ion battery 300 implemented as a pouch cell.

As described herein, a battery can be implemented as a pouch cell. FIG. 9 shows a cross-sectional schematic diagram of an example of a lithium ion battery 300 implemented as a pouch cell, according to some embodiments. The battery 300 comprises an anode 316 in contact with a negative current collector 308, a cathode 304 in contact with a positive current collector 310, a separator 306 disposed between the anode 316 and the cathode 304. A plurality of anodes 316 and cathode 304 may be arranged into a stacked configuration with a separator 306 separating each anode 316 and cathode 304. Each negative current collector 308 may have one anode 316 attached to each side; each positive current collector 310 may have one cathode 304 attached to each side. The stacks are immersed in an electrolyte 314 and enclosed in a pouch 312. The anode 302 and the cathode 304 may comprise one or more respective electrode films formed thereon. The number of electrodes of the battery 300 may be selected to provide desired device performance.

With further reference to FIG. 9, the separator 306 may comprise a single continuous or substantially continuous sheet, which can be interleaved between adjacent electrodes of the electrode stack. For example, the separator 306 may be shaped and/or dimensioned such that it can be positioned between adjacent electrodes in the electrode stack to provide desired separation between the adjacent electrodes of the battery 300. The separator 306 may be configured to facilitate electrical insulation between the anode 302 and the cathode 304, while permitting ionic transport between the anode 302 and the cathode 304. In some implementations, the separator 306 may comprise a porous material, including a porous polyolefin material.

The lithium ion battery 300 may include an electrolyte 314, for example an electrolyte having a composition as described herein. The electrolyte 314 is in contact with the anode 302, the cathode 304, and the separator 306.

With continued reference to FIG. 9, the anode 302, cathode 304 and separator 306 of the lithium ion battery 300 may be enclosed in a housing comprising a pouch 312. The pouch 312 may comprise a flexible material. For example, the pouch 312 may readily deform upon application of pressure on the pouch 312, including pressure exerted upon the pouch 312 from within the housing. In some implementations, the pouch 312 may comprise aluminum. For example, the pouch 312 may comprise a laminated aluminum pouch.

The lithium-ion battery 300 may comprise an anode connector (not shown) and a cathode connector (not shown) configured to electrically couple the anodes and the cathodes of the electrode stack to an external circuit, respectively. The anode connector and a cathode connector may be affixed to the pouch 312 to facilitate electrical coupling of the battery 300 to an external circuit. The anode connector and the cathode connector may be affixed to the pouch 312 along one edge of the pouch 312. The anode connector and the cathode connector can be electrically insulated from one another, and from the pouch 312. For example, at least a portion of each of the anode connector and the cathode connector can be within an electrically insulating sleeve such that the connectors can be electrically insulated from one another and from the pouch 312. In some embodiments, the cathode electrode comprises NCM active material, a carbon conductive additive, and a binder material. In some embodiments, the anode electrode comprises Si active material, a conductive carbon and Cu foil as a substrate.

Electrodes

Several types of silicon materials, e.g., silicon nanopowders, silicon nanofibers, porous silicon, and ball-milled silicon, may be used as active materials for the anode or the cathode. Small particle sizes (for example, sizes in the nanometer range) generally can increase cycle life and rate performances. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell in excess of 300% upon lithium insertion. Thus, it may advantageous to allow anodes including silicon to expand while maintaining electrical contact between the silicon particles.

As described in U.S. patent application Ser. Nos. 13/008,800 and 13/601,976, entitled "Composite Materials for Electrochemical Storage" and "Silicon Particles for Battery Electrodes," respectively, a composite material comprising a carbonized polymer and silicon particles can be used as an anode material. The carbonized polymer is made by converting a polymer into an electrically conductive and electrochemically active matrix. The converted polymer may act as an expansion buffer for silicon particles during cycling so that a high cycle life can be achieved. In some implementations, the composite material film may contain greater than 0% and less than about 90% by weight of silicon particles and greater than 0% and less than about 90% by weight of one or more types of carbon phases, wherein at least one of the one or more types of carbon phases is a substantially continuous phase that holds the composite material film together such that the silicon particles are distributed throughout the composite material film. In certain implementations, the resulting electrode is an electrode that is comprised substantially of active material. Optionally, the composite material film is a self-supported monolithic structure. The composite materials can be described as, for example, silicon composite materials, carbon composite materials, and/or silicon-carbon composite materials.

The amount of silicon in the composite material is greater than zero % by weight. In certain implementations, the composite material contains an amount of silicon from greater than 0% to about 90% by weight, from greater than 0% to about 80% by weight, from greater than 0% to about 70% by weight, from about 10% to about 90% by weight, from about 30% to about 80% by weight, from about 50% to about 90% by weight, from about 50% to about 80% by weight, from about 50% to about 70% by weight, and from about 60% to about 80% by weight. In certain implementations, the amount of silicon in the composite material is at least about 30% by weight, more about 50% by weight, more than about 60% by weight, more than about 70% by weight, or more than about 80% by weight.

The silicon particles in the composite material can have a largest dimension of less than about 40 μm, less than about 1 µm, less than about 500 nm, less than about 100 nm, and about 100 nm. Alternatively, the silicon particles can have a largest dimension of between about 10 nm and about 40 µm, or between about 10 nm and all values up to about 40 µm. For example, between about 10 nm and about 30 µm, 0.1 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 40 µm, between about 1 µm and about 30 µm, between about 1 µm and about 20 µm, between about 5 µm and about 20 µm, etc. Thus, the average particle size can be any value between about 10 nm and about 40 µm, e.g., about 10 nm, about 50 nm, about 0.1 µm, about 0.5 µm, about 1 µm, about 5 µm, about 10 µm, about 15 µm, about 20 µm, about 25 µm, about 30 µm, about 35 µm, and about 40 µm. All, substantially all, or at least some of the silicon particles may have the largest dimension described above. Furthermore, the silicon particles may or may not be pure silicon. For example, the silicon particles may be substantially silicon or may be a silicon alloy. The silicon alloy may include silicon as the primary constituent along with one or more other elements.

Optionally, conductive particles that may also be electrochemically active can be included in the composite material. Such particles can enable both a more electronically conductive composite as well as a more mechanically deformable composite capable of absorbing the large volumetric change incurred during lithiation and de-lithiation. In certain implementations, a largest dimension of the conductive particles may be between about 10 nanometers and about 7 millimeters. All, substantially all, or at least some of the conductive particles may comprise the largest dimension described herein. In some implementations, an average or median largest dimension of the conductive particles may be between about 10 nm and about 7 millimeters. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

Cathode electrodes described herein may include metal oxide cathode materials, such as Lithium Cobalt Oxide ($LiCoO_2$) (LCO), Ni-rich oxides, high voltage cathode materials, lithium-rich oxides, nickel-rich layered oxides, lithium rich layered oxides, high-voltage spinel oxides, and high-voltage polyanionic compounds. Ni-rich oxides and/or high voltage cathode materials may include NCM and NCA. One example of a NCM material includes $LiNi_{0.6}Co_{0.2}Mn_{0.2}O_2$ (NCM-622). Lithium rich oxides may include $xLi_2Mn_3O_2 \cdot (1-x)LiNi_aCo_bMn_cO_2$. Nickel-rich layered oxides may include $LiNi_{1+x}M_{1-x}O_z$ (where M=Co, Mn or Al). Lithium rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc.

Electrolyte and Electrolyte Additives

An electrolyte for a lithium-ion battery can include a solvent and a lithium ion source, such as a lithium-containing salt. The solvent may include at least one cyclic carbonate. In some embodiments, the cyclic carbonate has a dielectric constant is large enough to separate the cation and anion in the lithium-containing salt. Examples on cyclic carbonates include ethylene carbonate (EC) and fluorinated ethylene carbonate (FEC). The solvent may include at least one linear carbonate. In some embodiments, and linear carbonates provide a conduction path for Li+ ions. Examples of linear carbonates include dimethyl carbonate (DMC), diethyl carbonate (DEC) and ethyl methyl carbonate (EMC).

The lithium-containing salt may include lithium hexafluorophosphate ($LiPF_6$) lithium tetrafluoroborate ($LiBF_4$), lithium hexafluoroarsenate monohydrate ($LiAsF_6$), lithium perchlorate ($LiClO_4$), lithium bis(trifluoromethanesulfonyl) imide (LiTFSI), lithium bis(fluorosulfonyl)imide (LiFSI), lithium bis(oxalato)borate (LiBOB), lithium difluoro(oxalate)borate (LiDFOB), lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), lithium perchlorate ($LiClO_4$), etc. In some embodiments, the lithium-containing salt concentration in the solvent may be about 0.5 M, about 0.6 M, about 0.7 M, about 0.8 M, about 0.9 M, about 1 M, about 1.1 M, about 1.2 M, about 1.3 M, about 1.4 M, about 1.5 M, about 1.6 M, about 1.8 M or about 2 M, or any range of values therebetween. The composition of the electrolyte may be selected to provide a lithium-ion battery with improved performance. Optionally, the electrolyte may contain an electrolyte additive. As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively.

The electrolyte for a lithium ion battery may also include additional co-solvent(s) comprising a fluorine-containing compound, such as a fluorine-containing cyclic carbonate, a fluorine-containing linear carbonate, and/or a fluoroether. The electrolyte may also include more than one solvent. Examples of the fluorine-containing compound include fluoroethylene carbonate (FEC), 1,1,2,2-tetrafluoroethyl 2,2,3,3-tetrafluoropropyl ether, trifluoropropylene carbonate (TFPC), and difluoroethylene carbonate (F2EC). In some implementations, the co-solvent may be selected from the group consisting of FEC, ethyl methyl carbonate (EMC), 1,1,2,2-tetrafluoroethyl 2,2,3,3-tetrafluoropropyl ether, difluoroethylene carbonate (F2EC), ethylene carbonate (EC), diethyl carbonate (DEC), dimethyl carbonate (DMC), propylene carbonate (PC), and gamma-Butyrolactone (GBL). In some implementations, the electrolyte contains FEC. In some implementations, the electrolyte contains both EMC and FEC. In some implementations, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some implementations, the electrolyte is free or substantially free of non-fluorine-containing cyclic carbonates, such as EC, GBL, and PC.

As used herein, a co-solvent of an electrolyte has a concentration of at least about 10% by volume (vol %), about 20 vol %, about 40 vol %, about 60 vol %, or about 80 vol %, or about 90 vol % of the electrolyte. Alternatively, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %.

For example, the electrolyte may contain a fluorine-containing cyclic carbonate, such as FEC, at a concentration of about 10 vol % to about 60 vol %, including from about 20 vol % to about 50 vol %, and from about 20 vol % to about 40 vol %. Alternatively, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. Alternatively, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %.

In some embodiments, the electrolyte is substantially free of cyclic carbonates other than fluorine-containing cyclic carbonates (e.g. non-fluorine-containing cyclic carbonates). Examples of non-fluorine-containing carbonates include EC, PC, GBL, and vinylene carbonate (VC).

The electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from about 1 wt % to about 9 wt %, from about 1 wt % to about 8 wt %, from about 1 wt % to about 7 wt %, from about 2 wt % to about 7 wt %, or any value in between.

EXAMPLES

Example electrodes were prepared to test electrochemical performance. Cathodes were prepared with NCM622 as an active material at 92 wt %, a carbon additive, PVDF as a binder, and a 15 micron thick Al foil.

The cathode electrode had around 3.0 g/cm$^3$ electrode density. Non-prelithiated anodes were prepared using a lamination method on a Cu foil using a freestanding electrode which had 95% of Si/C composite and 5% conductive graphite. The 5-Layer pouch stacked cell was prepared with a NCM622 based cathode and non-prelithited anode and electrolyte of FEC:EMC=30:70 wt % at 1.2M of LiPF$_6$. The pouch cell was stacked in the order of separator-anode-separator-cathode using 5-layer of cathodes and 6-layer of anodes.

The prelithiated anodes were prepared using Li metal was rolled in between two rollers to obtain a desired thickness. The rolled Li metal was then cut to the same size as the anode and then sandwiched around a non-prelithiated anode (i.e. in the order of Li layer-anode-Li layer). Pressure was then applied to start the reaction between Li metal and the non-prelithiated anode to form prelithiated anodes with Li$_x$Si$_y$ phase overnight. The prelithiated anodes were stacked in the same way as a non-prelithiated pouch cells. The 5-Layer pouch stacked cell was prepared with a NCM622 based cathode and prelithited anode and electrolyte of FEC:EMC=30:70 wt % at 1.2M of LiPF$_6$. The pouch cell was stacked in the order of separator-prelithiated anode-separator-cathode using 5-layer of cathodes and 6-layer of prelithiated anodes.

Figure 10:
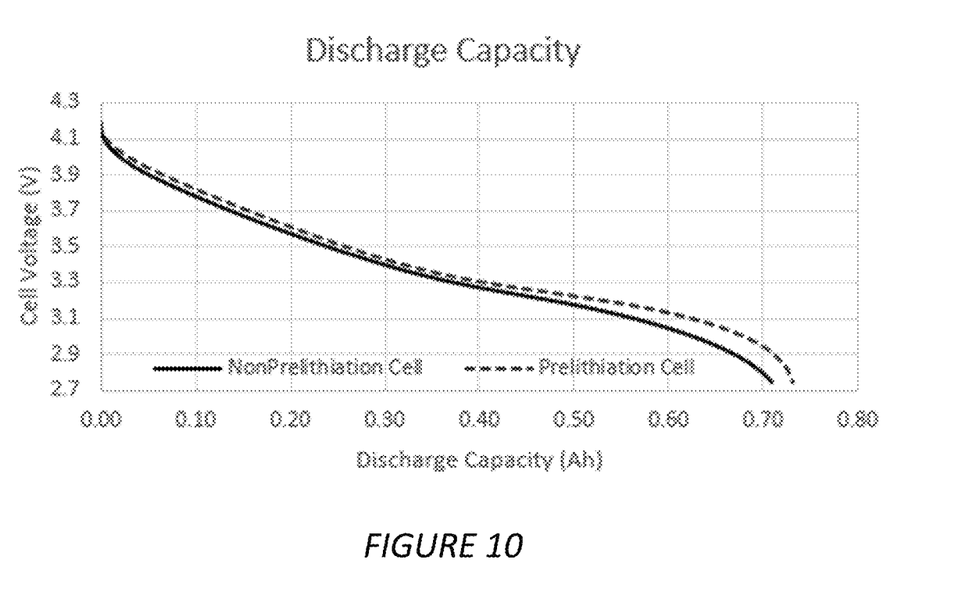
FIG. 10 shows the discharge capacity of a prelithiated cell compared to a control (non-prelithiated) cell.

FIG. 10 shows the discharge capacity of a prelithiated cell compared to a control cell (non-prelithiated), and demonstrates that prelithiation increases the cell capacity. It can be seen in FIG. 10 that prelithiated cells show a longer lasting voltage plateau towards the end of discharge. Furthermore, during cycling the additional amount of lithium stored in the silicon anode continues to reduce cycle fade when the cell is repeatedly charged and discharged.

Figure 11:
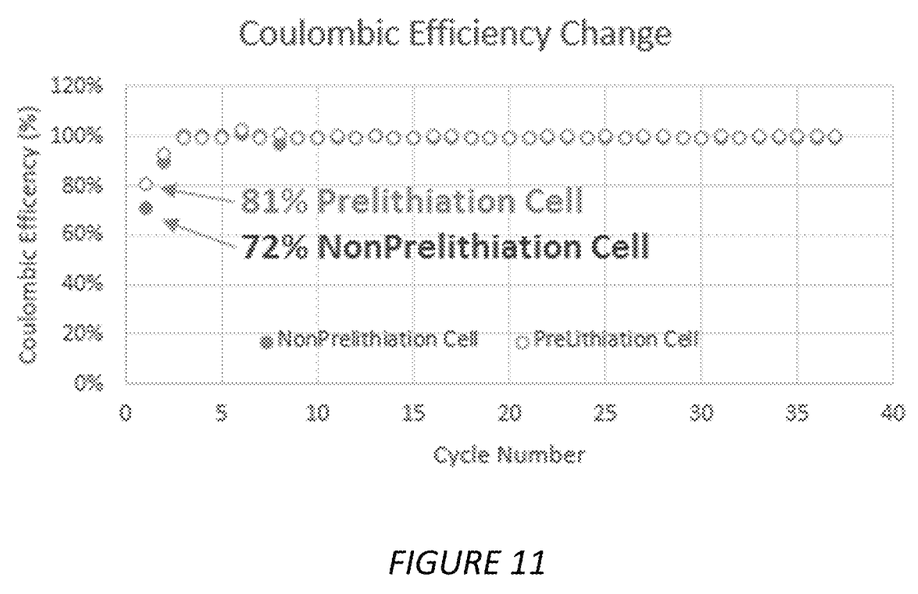
FIG. 11 shows the coulombic efficiency change over cycling of a prelithiated cell compared to a control (non-prelithiated) cell.

FIG. 11 shows the coulombic efficiency change over cycling of a prelithiated cell compared to a non-prelithiated cell. It can be seen in FIG. 11 that the prelithiated cell has improved initial Coulombic efficiency. Furthermore, the prelithiated cell has a higher initial Coulombic efficiency than the control cell. This is likely because the excess lithium stored in silicon anode helps to compensate the lithium loss during the solid-electrolyte interphase (SEI) formation in the first cycle. The prelithiated anode also shows a stable electrochemical potential, demonstrated by less fluctuations in voltage during charge and discharge, which allows the cell to have a higher efficiency.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming an energy storage device comprising:
   providing a Si-based anode;
   providing a cathode;
   providing a separator comprising a lithium layer on a surface of the separator;
   positioning the separator between the anode and the cathode, such that the lithium layer is in contact with the anode; and
   applying a clamping pressure to the energy storage device across the anode, the cathode, and the separator, wherein the clamping pressure is applied for at least 10 hours.

2. The method of claim 1, wherein the lithium layer comprises lithium deposited on the surface of the separator.

3. The method of claim 2, wherein the lithium is deposited on the surface of the separator by spraying powder lithium onto the surface or sputtering lithium onto the surface.

4. The method of claim 1, wherein the lithium layer comprises a lithium foil applied to the surface of the anode.

5. The method of claim 1, wherein the lithium layer comprises an amount of lithium for 10% to 30% of anode capacity.

6. The method of claim 1, wherein the separator is resistant to reduction by the lithium.

7. The method of claim 1, wherein the separator is made of a material selected from the group consisting of polyolefin, cellulose, and combinations thereof.

8. The method of claim 7, wherein the polyolefin is selected from polyethylene, polypropylene, and combinations thereof.

9. The method of claim 1, wherein the separator further comprises a surface coating between the surface of the separator and the lithium layer.

10. The method of claim 1, further comprises forming a safety layer on at least the lithium layer.

11. The method of claim 10, wherein the safety layer comprises a polymeric material.

12. The method of claim 11, wherein the polymeric material is selected from the group consisting of polyvinylidene fluoride (PVDF), poly(methyl methacrylate) (PMMA), styrene butadiene rubber (SBR), poly(acrylic acid) (PAA), poly(ethylene oxide) (PEO), poly(propylene oxide) (PPO), and combinations thereof.

13. The method of claim 1, wherein the clamping pressure is between 20 psi and 160 psi.

14. The method of claim 1, wherein the anode is a Si-dominant anode.

15. The method of claim 1, wherein the anode comprises a composite material film comprising:
   greater than 0% and less than 90% by weight of silicon particles, and
   greater than 0% and less than 90% by weight of one or more types of carbon phases, wherein at least one of the one or more types of carbon phases is to a greater extent continuous phase that holds the composite material film together such that the silicon particles are distributed throughout the composite material film.

16. The method of claim 15, wherein at least a portion of the composite material film has a self-supported monolithic structure.

17. A method of forming an energy storage device comprising:
   providing a Si-based anode;
   providing a cathode;
   providing a separator comprising a lithium layer on a surface of the separator;
   positioning the separator between the anode and the cathode, such that the lithium layer is in contact with the anode; and
   applying a clamping pressure to the energy storage device across the anode, the cathode, and the separator, wherein the clamping pressure is applied for at least 3 hours and is no greater than 160 psi.

18. The method of claim 17, wherein the lithium layer comprises lithium deposited on the surface of the separator.

19. The method of claim 18, wherein the lithium is deposited on the surface of the separator by spraying powder lithium onto the surface or sputtering lithium onto the surface.

20. The method of claim 17, wherein the lithium layer comprises a lithium foil applied to the surface of the anode.

21. The method of claim 17, wherein the lithium layer comprises an amount of lithium for 10% to 30% of anode capacity.

22. The method of claim 17, wherein the separator is resistant to reduction by the lithium.

23. The method of claim 17, wherein the separator is made of a material selected from the group consisting of polyolefin, cellulose, and combinations thereof.

24. The method of claim 23, wherein the polyolefin is selected from polyethylene, polypropylene, and combinations thereof.

25. The method of claim 17, wherein the separator further comprises a surface coating between the surface of the separator and the lithium layer.

26. The method of claim 17, further comprises forming a safety layer on at least the lithium layer.

27. The method of claim 26, wherein the safety layer comprises a polymeric material.

28. The method of claim 27, wherein the polymeric material is selected from the group consisting of polyvinylidene fluoride (PVDF), poly(methyl methacrylate) (PMMA), styrene butadiene rubber (SBR), poly(acrylic acid) (PAA), poly(ethylene oxide) (PEO), poly(propylene oxide) (PPO), and combinations thereof.

29. The method of claim 17, wherein the anode is a Si-dominant anode.

30. The method of claim 17, wherein the anode comprises a composite material film comprising:
   greater than 0% and less than 90% by weight of silicon particles, and
   greater than 0% and less than 90% by weight of one or more types of carbon phases, wherein at least one of the one or more types of carbon phases is to a greater extent continuous phase that holds the composite material film together such that the silicon particles are distributed throughout the composite material film.

31. The method of claim 30, wherein at least a portion of the composite material film has self-supported monolithic structure.

* * * * *